No. 744,997. Patented November 24, 1903.

UNITED STATES PATENT OFFICE.

ROSA HEWES BOYD, OF SEATTLE, WASHINGTON.

PLASTIC COMPOSITION.

SPECIFICATION forming part of Letters Patent No. 744,997, dated November 24, 1903.

Application filed February 26, 1901. Renewed April 2, 1903. Serial No. 150,845. (No specimens.)

*To all whom it may concern:*

Be it known that I, ROSA HEWES BOYD, a citizen of the United States, residing at Seattle, in the county of King and State of Washington, have invented new and useful Improvements in Plastic Compositions, of which the following is a specification.

My invention relates to new and useful compositions of matter; and the object of the same is to form a composition which will be plastic when wet, hard when dry, and capable of being molded into useful articles, such as tiles, brush-handles, toys, &c.

With this object in view I take the ingredients set forth in the following table and mix them thoroughly together in the proportions set opposite: wood-pulp, three parts; flour, six parts; Egyptian lacquer, one part; liquid silicate, one part; water, one part.

Instead of any of the above ingredients I may employ an equivalent thereof—that is, I may substitute paper-pulp for the wood-pulp and use either wheat, potato, or rice flour. The proportions may be varied within moderate limits without departing from the spirit and scope of my invention. Water enough is added to make a stiff paste suitable for molding.

Having described my invention, what I claim as new, and wish to secure by Letters Patent, is—

The composition of matter comprising wood-pulp, flour, Egyptian lacquer, liquid silicate, and water, substantially in the manner described and in the proportions set forth.

In testimony whereof I have hereunto set my hand in presence of two subscribing witnesses.

ROSA HEWES BOYD.

Witnesses:
JOHN J. FALAHER,
RICHARD S. TREACY.